United States Patent
Backes

(10) Patent No.: US 8,338,774 B2
(45) Date of Patent: Dec. 25, 2012

(54) OPTICAL SENSOR WITH LIGHT-BLOCKING AND LIGHT-TRANSMISSIVE SURFACE REGIONS

(75) Inventor: Ulrich Backes, Radolfzell (DE)

(73) Assignee: TRW Automotive Electronics & Components GmbH, Radolfzell (DE)

( * ) Notice: Subject to any disclaimer, the term of this patent is extended or adjusted under 35 U.S.C. 154(b) by 649 days.

(21) Appl. No.: 12/488,739

(22) Filed: Jun. 22, 2009

(65) Prior Publication Data

US 2010/0012824 A1    Jan. 21, 2010

(30) Foreign Application Priority Data

Jul. 15, 2008    (DE) .................. 10 2008 033 204

(51) Int. Cl.
G02B 6/42    (2006.01)

(52) U.S. Cl. .............. 250/227.25; 250/574; 340/602

(58) Field of Classification Search .......... 250/227.14, 250/227.24, 227.29, 227.3, 222.1, 574, 227.25; 318/484, 444; 340/602
See application file for complete search history.

(56) References Cited

U.S. PATENT DOCUMENTS

| | | | |
|---|---|---|---|
| 4,636,698 A | | 1/1987 | Leclercq |
| 5,602,384 A | | 2/1997 | Nunogaki et al. |
| 5,661,303 A | * | 8/1997 | Teder ................. 250/341.8 |
| 6,084,519 A | * | 7/2000 | Coulling et al. .......... 340/602 |
| 6,285,037 B1 | * | 9/2001 | Koyama et al. ........... 250/574 |
| 6,376,824 B1 | | 4/2002 | Michenfelder et al. |
| 6,573,995 B1 | | 6/2003 | Beutner et al. |
| 6,875,974 B2 | | 4/2005 | Muesch et al. |
| 7,214,918 B2 | | 5/2007 | Michenfelder et al. |
| 2003/0197114 A1 | | 10/2003 | Muesch et al. |
| 2004/0113053 A1 | | 6/2004 | Michenfelder et al. |
| 2004/0242986 A1 | * | 12/2004 | Matthews et al. ......... 600/401 |
| 2007/0034785 A1 | * | 2/2007 | Yoshigoe et al. ...... 250/227.25 |
| 2007/0235638 A1 | | 10/2007 | Backes et al. |

FOREIGN PATENT DOCUMENTS

| | | |
|---|---|---|
| DE | 102004015040 | 10/2005 |
| DE | 102004033696 | 2/2006 |
| DE | 102007036492 | 2/2009 |
| EP | 1431142 | 5/2003 |
| EP | 1431142 | 6/2004 |
| EP | 1842751 | 10/2007 |
| FR | 2722291 | 1/1996 |
| FR | 2787406 | 6/2000 |
| JP | 6194860 | 5/1986 |
| JP | 11295214 | 10/1999 |
| JP | 2002500769 | 1/2002 |
| JP | 200496638 | 3/2004 |
| JP | 2007278711 | 10/2007 |
| WO | 91/03393 | 3/1991 |

* cited by examiner

*Primary Examiner* — Francis M Legasse, Jr.
(74) *Attorney, Agent, or Firm* — Tarolli, Sundheim, Covell & Tummino LLP

(57) ABSTRACT

An optical sensor has an optical plate which is adapted to make surface contact on a pane, in particular a windshield of a motor vehicle. It further has one or preferably a plurality of photoreceivers arranged on the side of the optical plate facing away from the pane. An optical mask is arranged in the optical path upstream of each photoreceiver, the optical mask having light-blocking and light-transmissive surface areas. The light-transmissive surface areas each allow an optical path to traverse the optical plate, impinging on the photoreceiver and is delimited by the light-blocking surface areas.

11 Claims, 2 Drawing Sheets

OPTICAL SENSOR WITH LIGHT-BLOCKING AND LIGHT-TRANSMISSIVE SURFACE REGIONS

FIELD OF THE INVENTION

The invention relates to an optical sensor including an optical plate which is adapted to make surface contact on a pane, in particular a windshield of a motor vehicle, and at least one photoreceiver which is arranged on the side of the optical plate facing away from the pane. Typical examples of such sensors are light sensors for controlling the lighting system in a motor vehicle or solar sensors that supply an input parameter for a climate control, often in combination with a rain sensor for automatic control of the windshield wipers.

BACKGROUND

Conventional sensors of this type have an optical plate which has both convex lens structures and optical waveguides formed therein. The lenses focus the light incident on the pane, which is then guided through the optical waveguides and onto the photoreceivers. With its lens and optical waveguide structures that effect multiple deflections of the light beams, the optical plate has a fairly complex three-dimensional shape in adaptation to the spatial arrangement of the photoreceivers that are usually mounted on a printed circuit board. The complexity is especially great and a particularly large amount of space is required when the sensor comprises a plurality of sensor units, for example a rain sensor and light sensors.

A very much lower complexity and space requirement are achieved when an optical plate is used in which the lens structures are Fresnel lenses. A sensor of this type is the subject matter of unpublished document DE 10 2007 036 492.1.

Optical sensors typically have a light directional characteristic which is dependent on the desired function. To the extent possible, rain sensors should only receive light which originates from a pulsating light source and is totally reflected on the windshield. Ambient light should be suppressed to the extent possible because it could only affect the measurement of the rain-related events. Light sensors, on the other hand, are designed to selectively receive light incident from specific directions and traversing the windshield, such as, e.g., frontally from a narrow solid angle or else non-directionally. The desired directional characteristic may be attained by taking various measures all of which, however, are involved and require additional space.

SUMMARY

The present invention provides an optical sensor in which the optimum light directional characteristic for a particular application is achieved with very little expense involved and with no additional space required. To this end, an optical mask is arranged in the optical path upstream of the photoreceiver, the optical mask having light-blocking and light-transmissive surface areas; the light-transmissive surface areas allow an optical path that traverses the optical plate, impinges on the photoreceiver and is delimited by the light-blocking surface areas. The optical mask requires no space whatsoever; it may be applied, more particularly printed, directly on the surface of the optical plate facing the photoreceiver or photoreceivers. Since the optical mask may be arranged directly in the optical path upstream of the photoreceivers, any exposure of the photoreceivers to undesirable light components is virtually excluded, in particular in cooperation with the directional or focusing function of the optical plate.

Further details will be apparent from the following description of an exemplary embodiment of the invention with reference to the accompanying drawings.

DETAILED DESCRIPTION OF AN EXAMPLE EMBODIMENT

Figure 1:
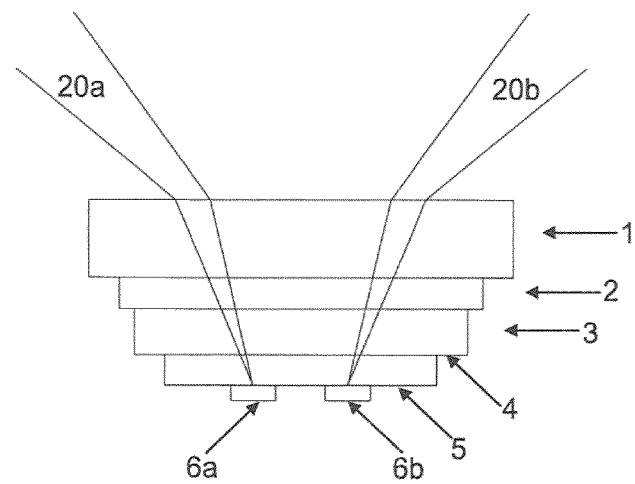
FIG. 1 shows a schematic sectional view of an optical sensor having two sensor units.

The optical sensor schematically illustrated in FIG. 1 is intended for mounting on the inside of a windshield 1 and includes two sensor units. The sensor is coupled to the surface of the windshield 1 by means of a transparent coupling layer 2, which is, e.g., a transparent rubber or a gel. The essential component of the sensor is an optical plate 3 which is made of a transparent plastic material. On its surface facing away from the windshield 1, the optical plate 3 carries an optical mask 4 which consists of a grid of light-blocking 7 and light-transmissive surface regions 9. A pair of photoreceivers 6a, 6b are coupled to the optical plate 3 and the optical mask 4 by means of a transparent coupling layer 5.

Figure 1A:
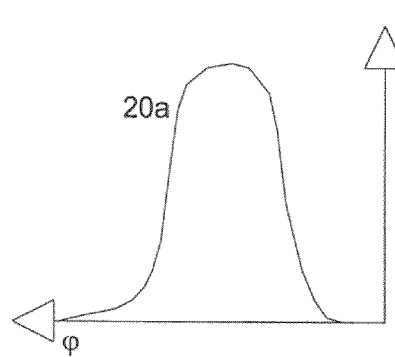
FIG. 1a shows the directivity characteristic of one sensor unit of the optical sensor in FIG. 1.
Figure 1B:
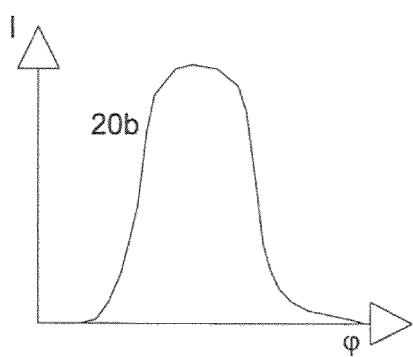
FIG. 1b shows the directivity characteristic of the other sensor unit of the optical sensor in FIG. 1.
Figure 2:
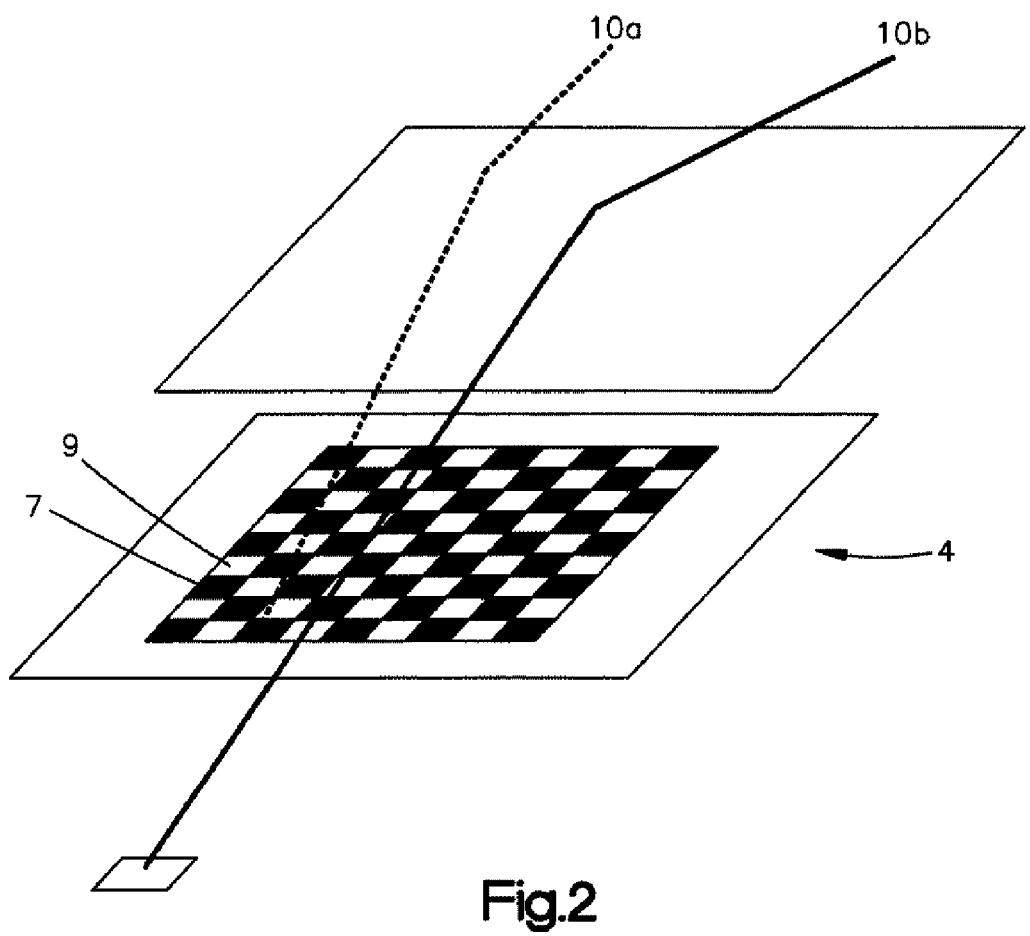
FIG. 2 shows a schematic perspective view of a sensor unit.

In the configuration of the sensor as shown in FIG. 1, the windshield 1, the coupling layers 2 and 5, and the optical plate 3 all have the same refractive index. As a consequence, any light beams incident on the windshield are directed through in a straight line onto the light-sensitive surfaces of the photoreceivers 6a, 6b. However, the passage of light is limited by the optical mask 4, as is illustrated in FIG. 2. The light-transmissive surface regions 9 of the mask 4 form passage windows that are limited by the light-blocking surface regions 7. In the embodiment shown in FIG. 2, the patterned elements 7,9 are small squares. Contrary to the schematic illustration in FIG. 2, the edge lengths of the squares are very much smaller than the extent of the light-sensitive surface of the photoreceivers. In this way, a smoothed curve for the directional characteristic is obtained, as illustrated in FIGS. 1a and 1b for two beams of rays 20a and 20b which are incident on the photoreceivers 6a and 6b, respectively.

FIG. 2 clearly shows the function of the optical mask. A light beam 10a, which is illustrated by a dotted line, impinges on light-blocking surface regions 7 of the mask 4 and is absorbed. A light beam 10b, which is illustrated by a solid line, impinges on light-transmissive surface regions 9 of the mask 4 and is allowed to pass to the photoreceiver 6.

The first and second sensor units in FIG. 1 contain the photoreceivers 6a and 6b, respectively. Both sensor units detect ambient light that is incident on the windshield. But, the first sensor unit has the directional characteristic 20a in FIG. 1a and the second sensor unit has the directional characteristic 20b in FIG. 1b.

In practical embodiments the sensor comprises further sensor units not shown here, in particular a rain sensor. The rain sensor requires lens structures for focusing a light beam from a pulsating light source, which is totally reflected on the windshield. The necessary lens structures are configured as Fresnel lenses by stamping or embossing the optical plate 4.

The Fresnel lenses cooperate with the optical mask, which allows only useful light rays to pass and in this way shields the photoreceivers from an entry of extraneous light.

The sensor having a plurality of sensor units is of an extremely compact structure. In spite of the complex functions of the sensor, it is very cost-effective to manufacture and, in addition, easy to adjust to the respective requirements of particular applications by appropriately applying the optical mask with light-blocking and light-transmissive surface regions, for example by printing on a surface of the optical plate or by gluing on a film.

Although the invention has been described hereinabove with reference to a specific embodiment, it is not limited to this embodiment and no doubt further alternatives will occur to the skilled person that lie within the scope of the invention as claimed.

The invention claimed is:

1. An optical sensor comprising
    an optical plate which is adapted to make surface contact on a windshield of a motor vehicle,
    a plurality of sensor units having different light directional characteristics being formed by
    a plurality of photoreceivers which are all arranged on a side of the optical plate facing away from the windshield and
    light-transmissive surface regions of an optical mask which are associated with the photoreceivers and arranged in the optical path upstream of the photoreceivers,
    the light-blocking and light-transmissive surface regions being formed in a patterned structure that consists of multiple patterned elements, each having a surface area that is small in comparison with the surface area of the light-sensitive surface of the photoreceivers,
    wherein the light-transmissive surface regions expose optical paths delimited by the light-blocking surface regions for ambient light incident on the windshield, traversing the optical plate, and impinging on the photoreceivers, forming two beams of rays each of which is incident on one of the photoreceivers with a smooth curve for the directional characteristic.

2. The optical sensor according to claim 1, wherein the optical plate includes Fresnel lens structures.

3. The optical sensor according to claim 1, wherein the optical mask is arranged between the optical plate and the photoreceivers.

4. The optical sensor according to claim 1, wherein the light-blocking surface regions are formed by an opaque layer from which the light-transmissive surface regions are recessed.

5. The optical sensor according to claim 1, wherein the patterned elements are square.

6. The optical sensor according to claim 1, wherein the optical plate includes first and second surfaces that extend substantially parallel to first and second surfaces of the optical mask, the optical path passing through the first and second surfaces of the optical plate and the first and second surfaces of the optical mask.

7. The optical sensor according to claim 1, wherein the light-blocking surface regions and light-transmissive surface regions of the optical mask are patterned in a grid of squares.

8. The optical sensor according to claim 1, wherein the optical mask has a substantially planar configuration.

9. The optical sensor according to claim 3, wherein the optical mask is applied over an area on a side of the optical plate facing the photoreceivers.

10. The optical sensor according to claim 9, wherein the optical mask is printed on the side of the optical plate facing the photoreceivers.

11. The optical sensor according to claim 9, wherein the photoreceivers are coupled to the optical plate via an optical coupling layer.

* * * * *